United States Patent [19]

Kirchhoff et al.

[11] Patent Number: 5,247,037
[45] Date of Patent: Sep. 21, 1993

[54] MONO(CYCLOBUTARENE)/POLYMALEI-MIDE COPOLYMERS

[75] Inventors: Robert A. Kirchhoff; Lana S. Spencer, both of Midland; Kenneth J. Bruza, Alma, all of Mich.

[73] Assignee: The Dow Chemical Company, Midland, Mich.

[21] Appl. No.: 766,392

[22] Filed: Sep. 30, 1991

Related U.S. Application Data

[63] Continuation-in-part of Ser. No. 630,596, Dec. 20, 1990, abandoned, and a continuation-in-part of Ser. No. 630902, Dec. 20, 1990, abandoned.

[51] Int. Cl.$^5$ .................. C08F 222/40; C08F 212/32
[52] U.S. Cl. .................... 526/262; 526/347
[58] Field of Search ........................ 526/262

[56] References Cited

U.S. PATENT DOCUMENTS

| | | | |
|---|---|---|---|
| 3,652,726 | 3/1972 | Nield et al. | 260/876 |
| 3,998,786 | 12/1976 | D'Aleilo | 260/47 |
| 4,518,754 | 5/1985 | Locatelli et al. | 526/262 |
| 4,546,638 | 10/1985 | Field | 72/455 |
| 4,564,683 | 1/1986 | Adams et al. | 548/521 |
| 4,609,705 | 9/1986 | Crivello et al. | 524/779 |
| 4,638,078 | 1/1987 | Kirchhoff | 558/414 |
| 4,711,964 | 12/1987 | Tan et al. | 548/461 |
| 4,719,283 | 1/1988 | Bartmann | 528/322 |
| 4,724,260 | 2/1988 | Kirchhoff et al. | 546/112 |
| 4,730,030 | 3/1988 | Hahn et al. | 526/262 |
| 4,731,418 | 3/1988 | Dean | 525/205 |
| 4,745,166 | 5/1988 | Renner et al. | 526/259 |
| 4,826,997 | 5/1989 | Kirchhoff | 548/546 |
| 4,927,907 | 5/1990 | Corley | 528/322 |
| 4,954,583 | 9/1990 | Wang | 525/507 |
| 4,954,584 | 9/1990 | Wang | 525/507 |
| 4,968,754 | 11/1990 | Wong | 525/285 |
| 4,973,636 | 11/1990 | Corley | 526/262 |
| 4,977,223 | 12/1990 | Arnold et al. | 525/432 |
| 5,134,214 | 7/1992 | Bruza et al. | 526/262 |

FOREIGN PATENT DOCUMENTS 392354 5/1990 European Pat. Off.
402975 5/1990 European Pat. Off.

Primary Examiner—Joseph L. Schofer
Assistant Examiner—Wu C. Cheng
Attorney, Agent, or Firm—Michael P. Santovsa; Charles J. Enright

[57] ABSTRACT

Copolymers of a mono(cyclobutarene) comonomer and a polymaleimide comonomer are described. These copolymers have higher thermal stability and lower water absorption than polymaleimide homopolymers. They are useful in applications such as electronics, membranes, composites, coatings, and adhesives. Examples of such copolymers are those formed from the comonomers 1,1'-(methylenedi-4,1-phenylene)bismaleimide, and 3-(1-(4-methylphenyl)ethenyl)-bicyclo(4.2.0)octa-1,3,5-triene or 3-(2-(4-methylphenyl)ethenyl)-bicyclo(4.2.0)octa-1,3,5-triene.

17 Claims, No Drawings

MONO(CYCLOBUTARENE)/POLYMALEIMIDE COPOLYMERS

CROSS-REFERENCE TO RELATED APPLICATIONS

This Application is a combination and a continuation-in-part of U.S. patent application Ser. Nos. 07,630,596 and 07/630,902, both filed Dec. 20, 1990 and now abandoned.

BACKGROUND OF THE INVENTION

This invention relates to polymers prepared from cyclobutarene monomers, and processes for preparing them. Historically, one specie of this genus has been called benzocyclobutenes, but they are more properly named benzocyclobutanes, and will be called such in this document. The Chemical Abstract Service registry name is bicyclo(4.2.0)octa-1,3,5-triene.

Thermoset resins are compositions which solidify irreversibly upon curing. Such resins are useful in many engineering applications such as coatings, structural laminates, adhesives, films, and composites. Desirable physical properties include enhanced chemical resistance, high tensile strength, high temperature resistance, electroinsulative properties, and oxidative stability.

Many aerospace manufacturers require that composite materials retain greater than 50-60 percent of their strength at 325° F. after exposure to boiling water for prolonged time periods.

Bismaleimides are commercially available monomers currently being evaluated as a potential matrix resin for high performance structural composites where excellent thermal and thermooxidative stability are required. Unfortunately, polymaleimide homopolymers are susceptible to degradation of their physical properties by moisture as well as many common organic solvent. Polymaleimides have good thermal stability but are extremely brittle indicating that these thermoset resins have a high degree of crosslinking. In an attempt to solve this problem, a second component is sometimes added, usually an aromatic molecule with either an allyl or propenyl substituent. While these polymers have improved toughness over the bismaleimide homopolymers, they do not show any decreased water absorption.

It would be desirable to have new thermoset polymers with improved properties or improved combinations of properties compared to those of polymaleimide homopolymers. Some of these properties include decreased water absorption, enhanced solvent resistance, and a high glass transition temperature. It would be further desirable to prepare such polymers at temperatures lower than about 200° C.

SUMMARY OF THE INVENTION

This invention, in one aspect, is a monomer mixture comprising at least one polymaleimide and an internal olefinic mono(cyclobutarene) in an amount sufficient to provide decreased water absorption in a resulting cured copolymer compared to that observed for polymaleimide homopolymers. Preferably the polymaleimide is present in an amount sufficient to provide higher thermal stability in the cured copolymer than that observed for polymaleimide homopolymers. For the purposes of this invention, internal olefinic mono(cyclobutarene) refers to a cyclobutarene moiety containing a carbon-carbon double bond wherein neither carbon of the double bond occupies a terminal position of the cyclobutarene moiety.

In a second aspect, this invention is a monomer mixture comprising at least one polymaleimide and a monovinylidene mono(cyclobutarene) in an amount sufficient to provide a lower polymerization onset temperature as well as decreased water absorption in a resulting cured copolymer compared to that observed for polymaleimide homopolymers. Preferably the polymaleimide is present in an amount sufficient to provide higher thermal stability in the cured copolymer than that observed for polymaleimide homopolymers. Monovinylidene mono(cyclobutarene) herein refers to a cyclobutarene moiety containing a carbon-carbon double bond wherein one carbon atom of the double bond occupies a terminal position of the cyclobutarene moiety.

In a third aspect, this invention is a copolymer comprising, in polymerized form, at least one polymaleimide comonomer and an internal olefinic mono(cyclobutarene) comonomer in an amount sufficient to provide decreased water absorption in the resulting cured copolymer compared to that observed for polymaleimide homopolymers. Preferably the polymaleimide is present in an amount sufficient to provide higher thermal stability in the cured copolymer than that observed for polymaleimide homopolymers.

In a fourth aspect, this invention is a copolymer comprising, in polymerized form, at least one polymaleimide comonomer and a monovinylidene mono(cyclobutarene) comonomer in an amount sufficient to provide a lower polymerization onset temperature as well as decreased water absorption in the resulting cured copolymer compared to that observed for polymaleimide homopolymers. Preferably the polymaleimide is present in an amount sufficient to provide higher thermal stability in the cured copolymer than that observed for polymaleimide homopolymers.

In a fifth aspect, this invention is a process for producing the copolymer of the third and fourth aspects, said process comprising combining the monomers under conditions sufficient to form the copolymer. The monomer mixture thermally copolymerizes to yield, in preferred embodiments, rigid copolymers with a high glass transition temperature, enhanced thermal and thermooxidative stability, as well as decreased water absorption; all of the aforementioned properties being improved relative to those observed for polymaleimide homopolymers. They are useful in applications such as electronics, membranes, composites, coatings, and adhesives.

DETAILED DESCRIPTION OF THE INVENTION

The mono(cyclobutarene) monomer suitably employed in this invention is copolymerizable with a polymaleimide and has a cyclobutarene moiety and an internal ethylenic moiety or a monovinylidene moiety. Preferably such monomers correspond to the following two formulae:

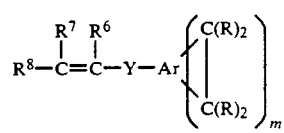

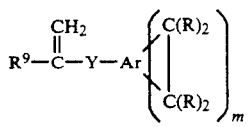

wherein

Ar is a polyvalent aromatic moiety, an ar-poly-yl, having three or more valences, provided that the two adjacent carbon atoms on the fused side of the cyclobutane ring are bonded to adjacent carbon atoms on the same aromatic ring of Ar, as hereinafter defined;

Y is a covalent bond or a divalent organic or inorganic moiety, as hereinafter defined;

m is an integer of at least 1;

R is a monovalent moiety, as hereinafter defined;

$R^6$ and $R^7$ are individually hydrogen or an alkyl moiety;

$R^8$ is hydrogen or a monovalent organic moiety provided that when $R^7$ is hydrogen $R^8$ is a monovalent organic moiety; and $R^9$ is a monovalent organic moiety or a heteroatom containing monovalent organic moiety.

Ar, Y, m, R, $R^6$, $R^7$, $R^8$ and $R^9$ are selected such that they do not interfere with polymerization.

For $R^6$ and $R^7$, alkyl means $C_1-C_{20}$ as hereinafter defined. Preferred alkyls are $C_1-C_{10}$. A more preferred alkyl is $CH_3$. Most preferably $R^6$ and $R^7$ are hydrogen.

Hereinafter the monomers represented by formula I will be called 1,2-monomers and the monomers represented by formula II will be called 1,1-monomers.

A cyclobutarene moiety is an aromatic moiety which contains one or more cyclobutane rings fused to an aromatic ring, provided that the carbons of the cyclobutane ring connected to R are also bonded to adjacent carbon atoms on the same aromatic ring of Ar. Aromatic moieties are carboxyclic or heterocyclic ring compounds containing (4n+2)n electrons in an orbital ring as described in Morrison & Boyd, Organic Chemistry, 3rd ed., 1973. This property is also known as resonance stabilization or delocalization. Carbocyclic means the aromatic moiety has only carbon atoms in its nucleus. Heterocyclic means the aromatic moiety has atoms other than, and in addition to, carbon in its nucleus. Suitable aromatic moieties are those derived from benzene, naphthalene, phenanthrene, anthracene, pyridine, biaryl moieties such as (1-methylethylidene)di-4,1-phenylene ester, bicyclo(4.2.0)-octa-1,3,5-triene-3-carboxylic acid; biphenyloxide; two or more aromatic moieties which are bridged by alkylene or cycloalkylene moieties, and the like. Preferred aromatic moieties are those derived from benzene, naphthalene, biphenyl, binaphthyl, diphenylalkene, and diphenylcycloalkene moieties. More preferred aromatic moieties are those derived from benzene, naphthalene, and biphenyl. The most preferred aromatic moiety is derived from benzene. Most preferably, the cyclobutarene moiety is a benzocyclobutane moiety, wherein the aromatic moiety, Ar, is a poly-yl derived from benzene.

The aromatic moiety can be further substituted with a variety of monovalent moieties. Examples of suitable monovalent moieties include —NO$_2$, —CN, Br, I, Cl, F, H, —OH, —PR$^5{}_2$, —CO$_2$R$^{10}$, —CHO,

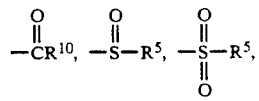

hydrocarbyl, hydrocarbyloxy, hydrocarbylthio, —OR$^{10}$, —NHR$^{10}$, and —NR$^{10}{}_2$, wherein R$^{10}$ is H or alkyl and R$^5$ is alkyl or aryl. Hydrocarbyl refers to any organic moiety containing only carbon and hydrogen atoms. The term hydrocarbyl means a monovalent hydrocarbon moiety including the following: alkyl, alkenyl, alkynyl, cycloalkyl, cycloalkenyl, cycloalkynyl, aryl, aliphatic and cycloaliphatic aralkyl and alkaryl, and the like. Aliphatic refers herein to straight- and branched-, and saturated and unsaturated, hydrocarbon chains, that is alkyl, alkenyl or alkynyl. Cycloaliphatic refers herein to saturated and unsaturated cyclic hydrocarbons, that is, cycloalkenyl, cycloalkynyl, and cycloalkyl. Aryl refers herein to biphenyl, phenyl, naphthyl, phenanthrenyl, anthracenyl and two aryl groups bridged by an alkylene group or heteroatoms such as oxygen and sulfur. Alkaryl refers herein to an alkyl-, alkenyl- or alkynyl-substituted aryl substituent wherein aryl is as defined hereinbefore. Alkenearyl refers herein to a moiety which contains at least one alkene portion and one aromatic portion, and includes those moieties in which more than one alkene portion alternates with more than one aromatic portion. $C_{1-10}$ alkyl includes straight- and branched-chain methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl groups. $C_{1-10}$ alkyl includes methyl, ethyl, propyl, butyl, pentyl, hexyl, heptyl, octyl, nonyl, and decyl.

Cycloalkyl refers to alkyl groups containing one or more cycloaliphatic rings. Cycloalkenyl refers to mono- and polycyclic groups containing one or more double bonds.

A divalent organic moiety, as a suitable example of Y, refers herein to any organic moiety bonded to two other moieties. The divalent organic moiety may also contain one or more heteroatoms, such as oxygen, nitrogen, phosphorus, silicon, or sulfur. Preferred divalent organic moieties include aliphatics such as alkyl, alkenyl, and alkynyl; arylenes such as

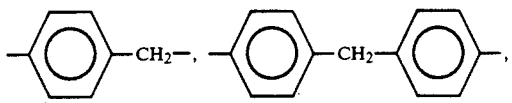

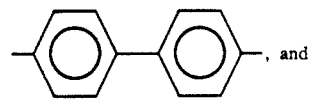, and

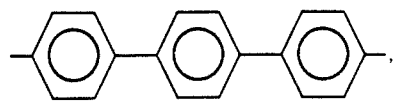, sulfones such as

-continued

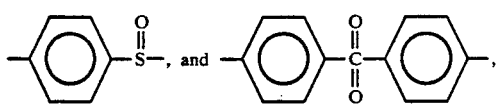

and carbonyl containing species such as

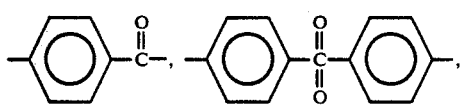

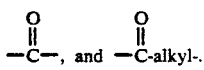

More preferred divalent organic moieties include arylenes, and carbonyl containing species.

A divalent inorganic moiety, as another suitable example of Y, refers herein to any inorganic moiety which can bond two other moieties. Preferred inorganic moieties include oxygen and sulfur. The most preferred inorganic moiety is oxygen. The most preferred Y is a direct bond.

The mono in mono(cyclobutarene) indicates that only one cyclobutarene moiety is present. Preferably R, $R^6$, and $R^7$ are hydrogen. $R^8$ and $R^9$ are preferably selected from the group consisting of phenyl, 2-naphthyl, p-tert-butylphenyl, 4-methylphenyl, 3-methylphenyl, 2-methylphenyl, and p-biphenyl.

When the mono(cyclobutarene) is an internal olefinic mono(cyclobutarene), $R^8$ is more preferably 4-methylphenyl, 3-methylphenyl, or 2-methylphenyl; and most preferably 4-methylphenyl.

When the mono(cyclobutarene) is a monovinylidene mono(cyclobutarene) $R^9$ may also be selected from the group consisting of

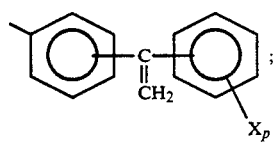

wherein p is 1, 2, 3, 4, or 5; and

X is separately and independently in each occurrence a monovalent moiety, as hereinbefore defined.

When the mono(cyclobutarene) is a monovinylidene mono(cyclobutarene) R is more preferably hydrogen, and $R^9$ is more preferably phenyl, 2-naphthyl, p-tert-butylphenyl, 3-methylphenyl, 4-methylphenyl, or p-biphenyl. Most preferably R is hydrogen and $R^9$ is 4-methylphenyl.

When the cyclobutarene moiety is benzocyclobutane, the preferred internal olefinic mono(cyclobutarene) monomers correspond to the formulae

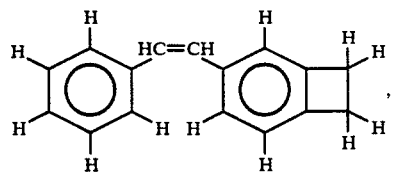

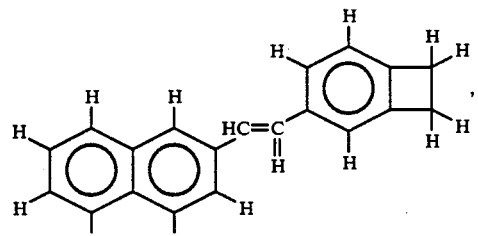

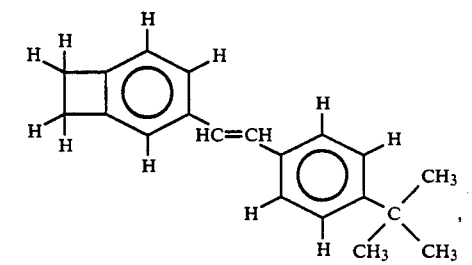

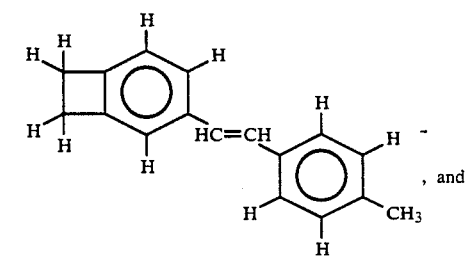

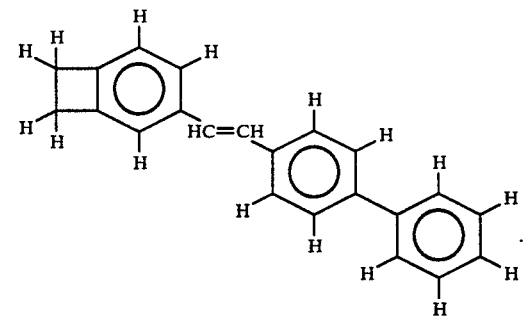

The most preferred internal olefinic mono(cyclobutarene)monomer corresponds to the formula:

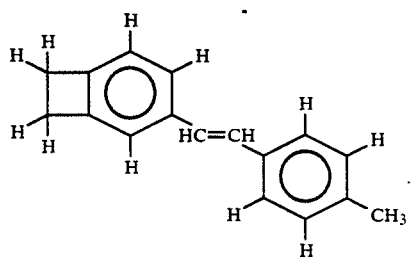

When the cyclobutarene moiety is benzocyclobutane, the preferred monovinylidene mono(cyclobutarene) monomers correspond to the formulae

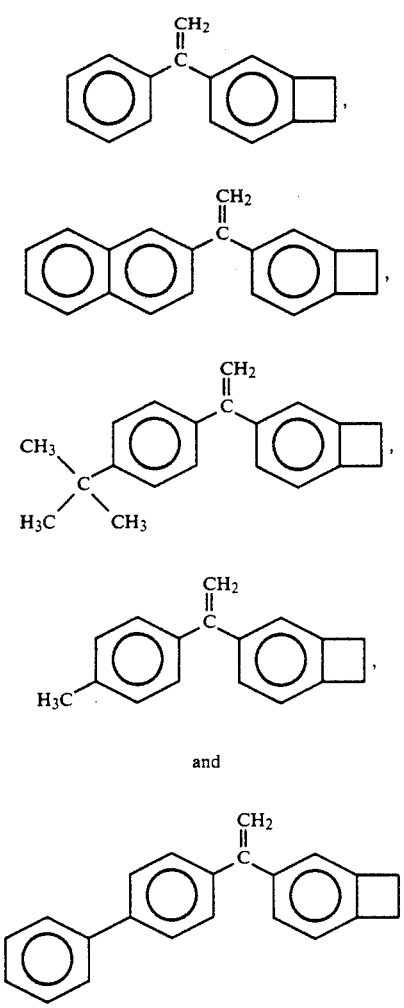

and

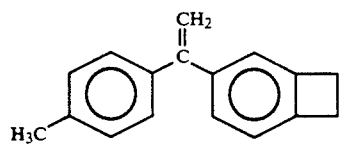

The most preferred monovinylidene mono(cyclobutarene)monomer corresponds to the formula:

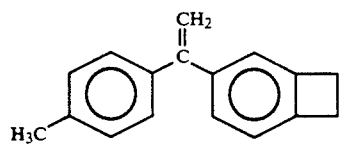

Suitable internal olefinic cyclobutarene monomers and their preparation are disclosed in U.S. Pat. Nos. 4,540,763; 4,783,514; 4,642,329; 4,831,172; 4,724,260; 4,743,399; and 4,661,193; all herein incorporated by reference. Methods of making the cyclobutarene precursors are disclosed in U.S. Pat. Nos. 4,562,280 and 4,570,011; herein incorporated by reference.

Suitable monovinylidene mono(cyclobutarene) monomers can be prepared by various routes.

One possible route is shown below.

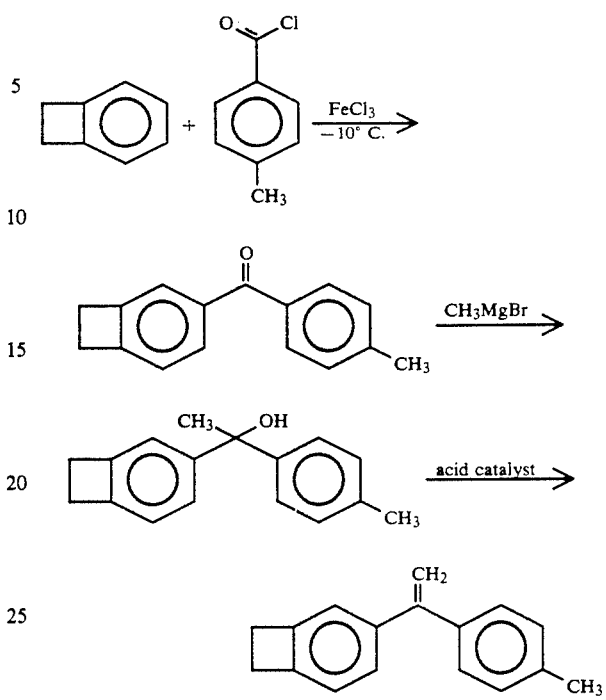

As is shown above, a cyclobutarene is combined with an alkylaromatic acid chloride in the presence of a Friedel Crafts catalyst to yield a diaryl ketone. The diaryl ketone is combined with a Grignard Reagent, such as methylmagnesiumbromide, to provide an alcohol product. Methyllithium can be used in place of the Grignard reagent to obtain the same alcohol product. The alcohol product is combined with an acid catalyst and one molecule of water is eliminate to form a 1,1-monomer. Suitable acid catalysts include mineral acids, Lewis acids, organic acids, clays, and silicas.

A second possible route for preparing the 1,1-monomers is as follows.

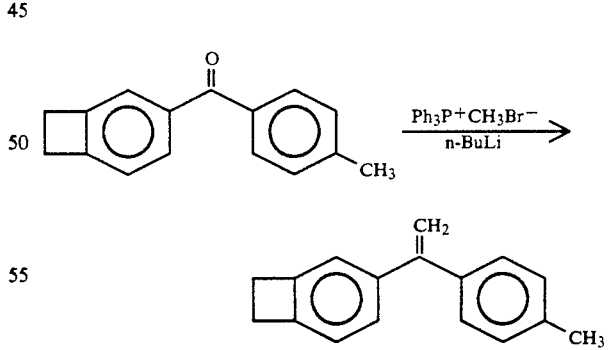

As shown above, methyltriphenylphosphoniumbromide is combined with n-butyllithium to make an ylid. The ylid reacts with the detone carbonyl, inserts a CH$_2$ group and simultaneously removes the oxygen, thereby producing a 1,1-monomer.

The polymaleimide monomers employed in preparing the polymers of this invention correspond to the formula

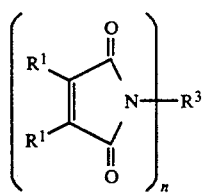

wherein n is an integer of 2 or greater;

R¹ is separately and independently in each occurrence, a monovalent moiety, as hereinbefore defined, provided that R¹ does not interfere with polymerization; and R³ is an n-valent bridging member comprising an n-valent organic or heteroatom containing organic moiety.

The n-valent organic bridging member refers to any organic moiety which can link 2 (when n=2) or more maleimide moieties (when n>2). Preferably, the n-valent organic bridging member is a hydrocarbon poly-yl or a heteroatom containing hydrocarbon poly-yl. Poly-yl refers herein to a polyvalent moiety. For example, ar-poly-yl refers to an polyvalent aromatic moiety. Poly refers herein to two or more. A hydrocarbon poly-yl is a hydrocarbon moiety which is bonded to 2 or more maleimides. A heteroatom containing hydrocarbon poly-yl is a hydrocarbon poly-yl which contains one or more of the heteroatoms comprising oxygen, sulfur, nitrogen, silicon, or phosphorus. The heteroatom in the heteroatom containing organic species is always removed from the maleimide ring nitrogen by at least one carbon atom. Included within the term hydrocarbon are any organic moieties containing carbon and hydrogen atoms.

Preferably, the maleimide moieties are connected by a bridging member comprising a polyvalent organic moiety.

More preferred R³ moieties are divalent and represented by the formulae:

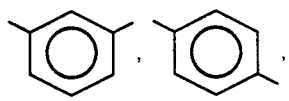

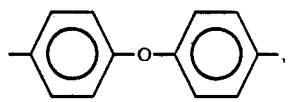

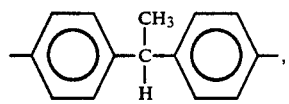

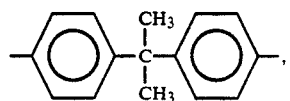

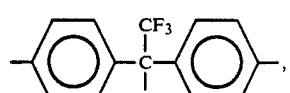

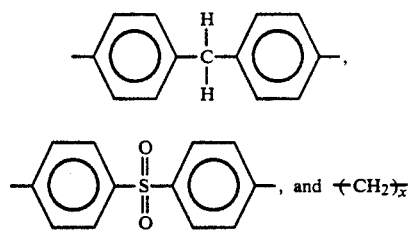

wherein x is at least 1. The most preferred R³ moiety is

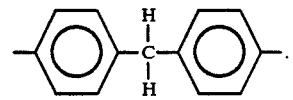

The polymaleimide is defined such that R¹ and R³ cannot be a cyclobutarene.

These polymaleimides are dienophilic and react with conjugated dienes to form a six-membered ring. Such dienophiles are discussed in Morrison and Boyd, Organic Chemistry, 3rd Ed., 1973.

The preferred polymaleimide comonomers (hereinafter called PMI comonomers) polymerize within about 50° C. of the 1,1- or 1,2-monomer polymerization temperature. More preferred polymaleimides includes 1,2-bismaleimido ethane, 1,4-bismaleimido butane, 1,6-bismaleimido hexane, 1,12-bismaleimido dodecane, 1,6-bismaleimido-(2,2,4-trimethyl) hexane, 1,3-bismaleimido benzene, 1,4-bismaleimido benzene, 4,4'-bismaleimido diphenyl methane, 4,4'-bismaleimido diphenyl ether, 4,4'-bismaleimido diphenyl sulfide, 4,4'-bismaleimido diphenyl sulfone, 4,4'-bismaleimido dicyclohexyl methane, 2,4-bismaleimido toluene, 2,6-bismaleimido toluene, N,N'-m-xylene bismaleic imide, N,N'-p-xylylene bismaleic imide, N,N'-m-phenylene-bis-citraconomide, N,N'-4,4'-diphenylmethanecitraconimide, and eutectic blends of bismaleimides such as Kerimid 601 TM, a trademark of Rhone-Poulenc, Compimide 353 TM and Compimide 796 TM, trademarks of Technochemie GMBH, Verfahrenstechnik, a subsidiary of Deutsche Shell AG. The compositions of these three trademarked materials are described in "Engineered Materials Handbook", Vol. 1, p78–89, Composites, ASM International. Methods of preparing such polymaleimides are disclosed in "Polymer", Vol. 26, p. 1561, Sep. 1985; U.S. Pat. Nos. 4,745,166; 4,464,520; 4,518,754; 4,711,964; 3,018,290; 4,460,783; 4,564,683; 3,890,272; 4,609,705; 4,288,583; and 4,116,937; all of which are herein incorporated by reference.

In addition to the PMI comonomer and the 1,2-comonomer, some embodiments of the copolymer of this invention contain one or more optional monomers, which can copolymerize with the PMI and 1,2-comonomers and may lower the polymerization initiation temperature. A second optional component may increase the molten monomer mixture's pot life and increase the cured resin's toughness.

In addition to the PMI comonomer and the 1,1-comonomer, some embodiments of the copolymer of this invention contain one or more optional monomers, which can copolymerize with the PMI and 1,1-comonomers and may increase the molten monomer mixture's pot life and increase the cured resin's toughness.

Suitable optional monomers which may be added to the PMI/1,2-comonomer system to lower the polymerization initiation temperature are monovinylidene mon(cyclobutarene)s which correspond to the formula:

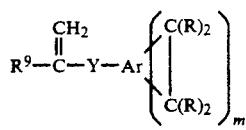

wherein
Ar, Y, R, m, and $R^9$ are as hereinbefore defined.

Preferably, the mole ration range of the 1,2-monomer to the optional 1,1-monomer component, should be an amount sufficient to lower the polymerization initiation temperature compared to that observed for polymaleimide homopolymers. More preferably, the mole ratio range of 1,2-monomer to the optional 1,1-monomer component, is about 80:20 to about 99:1, with the most preferred ratio range being about 90:10 to about 95:5.

Suitable optional components which may be added to increase the molten monomer mixture's pot life and increase the cured resin's toughness, relative to that observed for polymaleimide homopolymers, include free radical inhibitors such as 2,6-di-tert-butyl-4-methylphenol; tetrakis [methylene (3,5-di-tert-butyl-4-hydroxyhydrocinnamate)]methane; tris (2,4-di-tert-butylphenyl)phosphite; thiodiethylene bis-(3,5-di-tert-butyl-4-hydroxy)hydrocinnamate; octadecyl 3,5-di-tert-butyl-4-hydroxy)hydrocinnamate; N,N-diphenyl-p-phenylenediamine; 1,2-dihydro-2,2,4-trimethyldihydroquinoline; triphenylmethane;

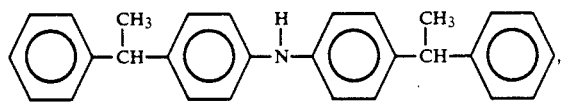

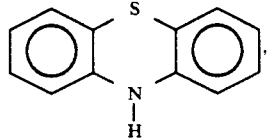

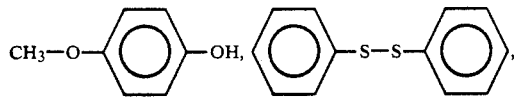

and a mixture of octylated diphenylamines such as

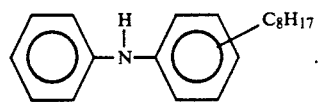

The most preferred free radical inhibitor is 2,6-di-tert-butyl-4-methylphenol.

Preferably, the mole ratio range of the 1,2-monomer or the 1,1-monomer to the optional free radical inhibitor component should be an amount sufficient to provide an increased molten monomer mixture pot life and increased toughness of the cured resin relative to that observed for polymaleimide homopolymers. More preferably, the mole ratio range of the 1,2-monomer or the 1,1-monomer to the optional free radical inhibitor component is from about 90:10 to about 99.99:0.01 with the most preferred range being from about 95:5 to about 99.95:0.05.

The amounts of PMI comonomer and 1,2-comonomer or 1,1-comonomer employed in preparing the copolymers of this invention can vary. Suitable amounts employed in preparing the copolymer derived from a PMI comonomer and a 1,2-comonomer are those which provide a monomer mixture that thermally polymerizes to yield rigid copolymers having a high glass transition temperature, enhanced thermal and thermooxidative stability, as well as decreased water absorption, and are useful in thermoset applications; some of which include, composites, coatings, and adhesives. Suitable amounts employed in preparing the the copolymer derived from a MI comonomer and the 1,1-comonomer additionally provide a polymerization onset temperature lower than that observed for a mixture of a polymaleimide and an internal olefinic mono(cyclobutarene). A preferred mole ratio of PMI to 1,2-monomer or 1,1-monomer is that which provides decreased water absorption, enhanced solvent resistance and thermal stability compared to the polymaleimide homopolymers. A more preferred mole ratio range of PMI to 1,2-monomer or 1,1-monomer is from about 80:20 to about 20:80. The most preferred mole ratio range of PMI to 1,2-monomer or 1,1-monomer is about 70:30 to about 30:70.

The copolymer composition is prepared by combining the 1,2-comonomer or the 1,1-comonomer and the PMI comonomer under conditions sufficient to form a copolymer. Application of heat is a preferred polymerization process since the comonomer mixture can thermally polymerize. Useful polymerization rates are obtained at about 60° C. and higher when using the 1,2-comonomer. When the 1,1-comonomer is employed the preferred temperatures range from about 120° C. to about 250° C. More preferred temperatures for the 1,1-comonomer system range from about 130° C. to about 180° C. The most preferred temperature for the 1,1-comonomer system is about 160° C. The preferred reaction conditions comprise conducting the polymerization in a nitrogen atmosphere, in the absence of solvents or catalysts, using the following cure cycle.

| |
|---|
| 140° C. for ½ hour |
| 160° C. for 1 hour |
| 180° C. for 1 hour |
| 200° C. for 1 hour |
| 250° C. for 1 hour |

When the 1,2-comonomer is employed, it is believed that the copolymer of this invention contains at least some of the following units.

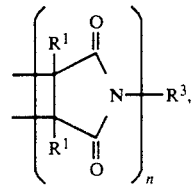

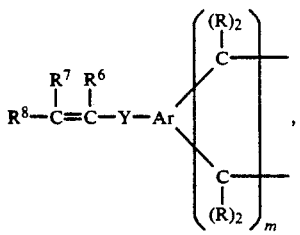

and

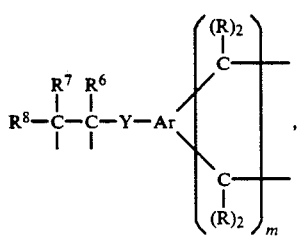

wherein R, $R^1$, $R^3$, $R^6$, $R^7$, $R^8$, Y, m, n, and Ar are as hereinbefore defined.

When the 1,1-comonomer is employed, it is believed that the copolymer of this invention contains at least some of the following units.

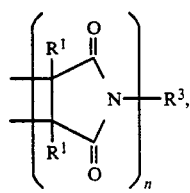

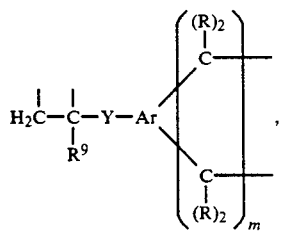

and

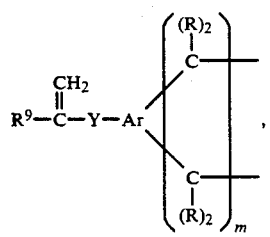

wherein Ar, Y, m, R, $R^9$, $R^1$, $R^3$, and n are as hereinbefore defined.

The monomer mixture may also be polymerized in the presence of additional optional components which are determined by the particular use of the copolymer. Such optional components include fibrous fillers such as glass, metal, quartz, and graphite; organic and inorganic powder fillers, organics such as polyaramids and polybenzoxazoles, catalysts, curing agents, fire retardants, and the like. For example, the copolymer composition can contain an amount of an electroconductive metal such as silver or gold powder and can be used as a die-attach material. In another example, the copolymer composition contains reinforcing glass fibers and can be used as a composite. In a third example, a composite comprises a reinforcing substrate and a copolymer of a polymaleimide and a 1,2-monomer or a 1,1-monomer.

The copolymers of this invention have improved physical properties or improved combinations of physical properties relative to polymaleimide homopolymers. For example, one or more of the following properties: adhesion, thermal stability, solvent resistance, dielectric constant, elongation at break, and toughness, may be improved.

Another advantageous property of these copolymers is their excellent long term thermal stability at elevated temperatures. These compositions typically exhibit less than 2.5 percent weight loss when heated in air at 300° C. for 66 hours.

Preferably, the copolymers of this invention have a glass transition temperature range of about 250° to about 350° C. More preferably their glass transition temperature range is from about 300° to about 350° C. The most preferred glass transition temperature range is from about 325° to about 350° C.

ILLUSTRATIVE EMBODIMENTS

The following examples are illustrative only, and do not limit the scope of the invention.

EXAMPLE 1

A 60 g (167.4 mmol) portion of 1,1'-(methylenedi-4,1-phenylene)bismaleimide, which melts at 155° C., is heated to around 160° C. A 40 g (181.7 mmol) portion of a 92:8 mole ratio mixture of 3-(2-(4-methylphenyl)ethenyl)-bicyclo(4.2.0)octa-1,3,5-triene and 3-(1-(4-methylphenyl)ethenyl)-bicyclo(4.2.0)octa-1,3,5-triene, which melts at 37° C., is heated to around 40° C. The molten 1,1'-(methylenedi-4,1-phenylene)bismaleimide is added to the mixture of 3-(2-(4-methylphenyl)ethenyl)-bicyclo(4.2.0)octa-1,3,5-triene and 3-(1-(4-methylphenyl)ethenyl)-bicyclo(4.2.0)octa-1,3,5-triene producing a liquid with water-like viscosity which is poured into a mold preheated to 140°-160° C. Alternatively, the 1,1'-(methylenedi-4,1-phenylene)bismaleimide and the mixture of 3-(2-(4-methylphenyl)ethenyl)-bicyclo(4.2.0)octa-1,3,5-triene and (3-(1-(4-methylphenyl)ethenyl)-bicyclo(4.2.0)octa-1,3,5-triene can be combined before heating. The combination is heated to 140° C. to obtain a homogeneous water-like melt which is poured into a preheated mold. The mold is closed and kept under a nitrogen atmosphere during a thermal cure cycle.

Two thermal cycles, shown in Table 1, can be used separately and independently to cure the compositions of Example 1.

TABLE 1

| CYCLE 1 | CYCLE 2 |
|---|---|
| 140° C./1 hr | 160° C./1 hr |
| 160° C./1 hr | 200° C./1 hr |
| 200° C./1 hr | 250° C./1 hr |
| 220° C./1 hr | |
| 250° C./1 hr | |
| 270° C./0.5 hr | |

The number before the slash is the temperature of each stage and the number after the slash is time in hours that the temperature is maintained. In cycle 1 the 3-(1(4-methylphenyl)ethenyl)-bicyclo(4.2.0)octa-1,3,5-triene reacts more completely at the lower temperatures before being exposed to the temperatures required for final polymer formation. Cycle 2 provides more rapid polymer formation, with similar properties to those formed with cycle 1 and thus may be favored in a production environment.

The copolymer plaques produced are a homogeneous, clear amber color; and are easily cut, sanded, or ground to size.

EXAMPLE 2

Copolymer of
3-(2-(4-Methylphenyl)Ethenyl)-Bicyclo(4.2.0)Octa-1,3,5-Triene with
1,1'-[Methylenedi-4,1-Phenylene]Bismaleimide Into a 250 cc flask is weighed 25 g (69.76 mmol) of 1,1'-[methylenedi-4,1-phenylene]bismaleimide which is heated to 160° C. under a nitrogen atmosphere. The 1,1'-]methylenedi-4,1-phenylene]bismaleimide melts at 154°-156° C. Into a second flask is weighed 25 g (113.6 mmol) of 3-(2-(4-methylphenyl)ethenyl)-bicyclo(4.2.-0)octa-1,3,5-triene which is heated to 140° C. 3-(2-(4-methylphenyl)ethenyl)-bicyclo(4.2.0-octa-1,3,5-triene melts at 92° C. and is a water-like fluid at 140° C. While the monomers are being heated, a steel mold with a ⅛ inch (0.635 cm) steel shim is assembled and heated to 160° C. under a nitrogen atmosphere. Once the monomers are liquid, the 1,1'-[methylenedi-4,1-phenylene]-bismaleimide is rapidly poured into the flask containing the 3-(2-(4-methylphenyl)ethenyl)-bicyclo(4.2.0)octa-1,3,5-triene at 140° C. The flask is maintained at 140° C. while the monomers are vigorously mixed. A homogeneous solution with a water-like viscosity is obtained after heating at approximately 140° C. for 5 minutes. With nitrogen flowing through it, the mold is quickly loaded with the homogeneous monomer mixture and closed. The temperature is raised to 160° C. and held for 90 minutes. The temperature is then increased to 1200° C. and held for 60 minutes. The temperature is raised a final time to 250° C. and held for 60 minutes, after which, while still at 250° C., the mold is opened. The copolymer plaque is removed and allowed to cool slowly on an insulated surface. The plaque dimensions are approximately 3×6×⅛ inch (7.62×15.24×0.318 cm) and weighs approximately 42-48 g. The weight reduction from the original 50 g is believed to be due to incomplete transfer of the molten monomer mixture. The copolymer plaque produced is a homogeneous, clear amber color, and is easily cut, sanded, or ground to size.

EXAMPLE 3

Copolymer of
3-(2-(4-Methylphenyl)Ethenyl)-Bicyclo(4.2.0)Octa-1,3,5-Triene with 1,1'with
1,1'-[Methylenedi-4,1-Phenylene]Bismaleimide Into a 100 cc glass vessel is placed 4.4026 g (20 mmol) of 2-(2-(4-methylphenyl)ethenyl)-bicyclo(4.2.0)octa-1,3,5-triene. Into a second glass vessel is placed 7.1672 g (20 mmol) of 1,1'-[methylenedi-4,1-phenylene]bismaleimide. Both vessels are placed in an oven at 160° C., under nitrogen. A 2×3×⅜ inch (5.08×7.62×0.95 cm) open faced mold is placed on a hot stage heating apparatus and brought to 160° C. Once the monomers melt, they are mixed at 160° C. to form a homogeneous mixture and then quickly poured into the open faced mold. The hot stage apparatus is closed and placed under nitrogen. The cure cycle is as follows: 160° C. for 1 hour, 200° C. for 1 hour, and 250° C. for 1 hour: after which the mold is removed from the hot stage and the polymer removed while still hot. This process produces a homogeneous, clear amber plaque; which weighs 10.78 g (93.2 percent mass recovery). The copolymer has excellent thermal and thermooxidative stability. Thermal Gravimetric Analysis of the copolymer in a nitrogen atmosphere, using a DuPont Model 951 Thermogravimetric Analyzer, shows a 1 percent weight loss at 432° C. and a 5 percent weight loss at 479° C. The glass transition temperature, measured under nitrogen using a DuPont Model 910 Differential Scanning Calorimeter, is 250° C. The thermal expansion coefficient, measured from 30°-250° C. using a DuPont Model 943 Thermalmechanical analyzer, is 54.4 ppm/° C. A rescan after cooling to room temperature shows a thermal expansion coefficient of 48.5 ppm/° C.

EXAMPLE 4

Copolymer of
1,1'-[Methylenedi-4,1-Phenylene]Bismaleimide with a Mixture of
3-(2-(4-Methylphenyl)Ethenyl)-Bicyclo(4.2.0)Octa-1,3,5-Triene and
3-(1-(4-Methylphenyl)Ethenyl)-Bicyclo(4.2.0)Octa-1,3,5-Triene Into a 100 cc glass vessel is placed 4.9732 g (22.59 mmol) of 3-(2-(4-methylphenyl)ethenylbicyclo(4.2.-0)octa-1,3,5-triene and 0.5506 g (2.50 mmol) of 3-(1-(4-methylphenyl)ethenyl)-bicyclo(4.2.0)octa-1,3,5-triene. Into a second glass vessel is placed 8.972 g (25.04 mmol) of 1,1'-[methylene-di-4,1-phenylene]bismaleimide. Both vessels are placed in an oven at 160° C., under nitrogen. A 2×3×⅜ inch (5.08×7.62×0.95cm) open faced mold is placed on a hot stage heating apparatus and brought to 160° C. Once the monomers melt, they are mixed at 160° C. to form a homogeneous mixture and then quickly poured into the open faced mold. The hot stage apparatus is closed and placed under nitrogen. The cure cycle is as follows: 160° C. for 5 minutes, 200° C. for 2 hours, and 250° C. for 1 hour; after which the mold is removed from the hot stage and the polymer removed while still hot. This process produces a homogeneous, clear amber plaque which weighs 13.8 g (93.6 percent mass recovery). The copolymer has excellent thermal and thermooxidative stability. Thermal Gravimetric Analysis of the copolymer in a nitrogen atmosphere, using a DuPont Model 951 Thermogravimetric Analyzer, shows a 1 percent weight loss at 453° C. and a 5 percent weight loss at 481° C. The glass transition temperature, measured under nitrogen using a DuPont Model 910 Differential Scanning Calorimeter, is not clearly defined. The thermal expansion coefficient, measured from 30°-250° C. using a DuPont Model 943 Thermalmechanical Analyzer, is 55.3 ppm/° C.

EXAMPLE 5

Table 2 shows the affect that increasing temperature has on the storage modulus of both dry and wet copolymer compositions of Example 1, as measured by Dynamic Mechanical Spectroscopy (DMS). DMS measures the dynamic storage modulus. DMS is run at a fixed frequency, such as one radian/second, and a fixed strain, such as 0.05 percent. Torsion is applied to 3 inch × ½ inch × ⅛ inch rectangular bars of the material being tested. The storage modulus is reported in dynes/cm$^2$, ksi (killopounds per square inch), or Pascals.

TABLE 2

| | STORAGE MODULUS G' (ksi) | | |
|---|---|---|---|
| | 25° C. | 150° C. | 300° C. |
| DRY | 198 | 163 | 86 |
| WET | 176 | 147 | 68 |

Table 2 shows that this copolymer retains a large amount of its modulus after being exposed to water for seven days. Additionally, it displays a substantial amount of retentive strength over a wide temperature range.

By varying the percent composition of the monomers, the moisture resistance of copolymers prepared by the procedure described in Example 1, can be improved in desired increments as shown in Table 3.

TABLE 3

| | WATER ABSORPTION | | |
|---|---|---|---|
| BMI$^d$/VT-BCB$^c$ WEIGHT RATIO | % WEIGHT GAIN$^a$ WATER | SHEAR$^b$ MODULUS DRY | WET |
| 50/50 | 0.6 | 176000 | 132500 |
| 40/60 | 0.7 | 198400 | 176400 |
| 30/70 | 0.5 | 199400 | 183600 |

$^a$after 168 h @ 95° C.
$^b$room temperature
$^c$a 90:10 mole ratio of 1-(4-methylphenyl)-2-(4-benzocyclobutenyl)ethylene to 1-(4-methylphenyl)-1-(4-benzocyclobutenyl)ethylene
$^d$1,1'-(Methylenedi-4,1-phenylene)bismaleimide Table 3 indicates that as more VT-BCB is added, both the dry and wet shear modulus improve significantly. The three samples (50/50; 40/60; 30/70) were prepared according to the procedure described in Example 4.

EXAMPLE 6

Table 4 shows the storage modulus retention as a function of temperature and wetness, as determined by Dynamic Mechanical Spectroscopy, for copolymers prepared by the method of Example 1.

TABLE 4

| | AFFECT OF WATER ON SHEAR MODULUS STORAGE MODULUS G' (ksi) | | | | | | | |
|---|---|---|---|---|---|---|---|---|
| BMI/VT-BCB | 25° C. | | 150° C. | | 177° C. (350° F.) | | 300° C. | |
| WT RATIO | DRY | WET | DRY | WET | DRY | WET | DRY | WET |
| 80/20 | 154 | — | 135 | — | 129 | — | 115 | — |
| 70/30 | 179 | 128 | 155 | 101 | 150 | — | 116 | 66 |
| 60/40 | 177 | — | 149 | — | 143 | — | 111 | — |
| 50/50 | 176 | 133 | 147 | — | 141 | — | 103 | — |
| 40/60 | 198 | 176 | 164 | 147 | 159 | 139 | 86 | 68 |
| 30/70 | 199 | 184 | 162 | 152 | 154 | 143 | 34 | 30 |

From the table it is apparent that, as the VT-BCB monomer weight ratio is increased, the percent retention of storage modulus is greater when measured at lower temperatures; and both the wet and dry fall off simultaneously around 300° C.

The copolymers prepared by the procedure described in Example 1 also have very good resistance to a wide variety of solvents, strong acids and bases as shown in Table 5.

TABLE 5

| SOLVENT RESISTANCE OF EXAMPLE 1 COPOLYMER | |
|---|---|
| SOLVENT, ACID, OR BASE | WEIGHT GAIN 10 DAYS @ Room Temperature |
| Ethyl acetate | none |
| Chloroform | none |
| Acetonitrile | none |
| Acetone | none |
| Ethanol | none |
| Dimethyl sulfoxide | none |
| Dimethyl formamide | none |
| Acetic acid | none |
| Toluene | none |
| Triglyme | none |
| Trifluoroacetic acid | partial solution; dispersed particles in liquid |
| 50% NaOH | none |
| 50% H$_2$SO$_4$ | darkening of acid; retention of polymer shape |

EXAMPLE 7

Copolymer of
3-(1-(4-Methylphenyl)Ethenyl)-Bicyclo(4.2.0)Octa-1,3,5-triene with
1,1'-[Methylenedi-4,1-Phenylene]Bismaleimide Into a 100 cc flask is weighed 7.1719 g (20.01 mmol) of 1,1'-(methylenedi-4,1-phenylene)-bismaleimide. Into a second flask is weighed 4.4154 g (20.06 mmol) of 3-(1-(4-methylphenyl)ethenyl)bicyclo(4.2.0)octa-1,3,5-triene. Both flasks are placed in an oven heated to 160° C. under a nitrogen atmosphere. While the monomers are being heated, an open faced mold is placed on a hot stage heating apparatus and brought to 40° C. Once the monomers are liquid, they are mixed together until homogeneous. With nitrogen flowing through it at atmospheric pressure, the mold is quickly loaded with the homogeneous monomer mixture and closed. The temperature is raised to 140° C. and held for one hour. The temperature is then increased to 170° C. and held for two hours. The temperature is raised a final time to 250° C. and held for two hours after which the plaque is removed immediately. The polymer is a clear burnished copper color and weighs 10.03 g which equals 87 percent mass recovery. Thermal Gravimetric Analysis of the copolymer in a nitrogen atmosphere, using a DuPont Model 951 Thermogravimetric Analyzer, shows a 1 percent weight loss at 424° C. and a 5 percent weight loss at 465° C. The glass transition temperature, measured under nitrogen using a DuPont Model 910 Differential Scanning Calorimeter, is 288° C. The thermal expansion coefficient, measured from 70°-270° C. using a DuPont Model 943 Thermalmechanical Analyzer, is 56 ppm/° C.

EXAMPLE 8

Copolymer of 3-(1-(4-Methylphenyl)Ethenyl)-Bicyclo(4.2.0)Octa-1,3,5-Triene with 1,1'-]Methylenedi-4,1-Phenylene]Bismaleimide Into a 30 cc glass vessel is placed 2.0 g (5.581 mmol) of 1,1'-(methylenedi-4,1-phenylene)bismaleimide and 0.025 g (0.1135 mmol) of 2,6-di-tert-butyl-4-methylphenol. Into a second glass vessel is placed 1.23 g (5.588 mmol) of 3-(1-(4-methylphenyl)ethenyl)-bicyclo(4.2.-0)octa-1,3,5-triene. Both vessels and a glass polymerization tube are place in an oven at 160° C., under nitrogen. Once the monomers melt, they are mixed together to form a homogeneous mixture and quickly loaded into the hot polymerization tube. The tube is sealed with a nitrogen inlet and immersed in an oil bath at 160° C. The cure cycle is as follows: 160° C. for 1 hour, 200° C. for 2 hours, and 250° C. for 1 hour; after which the tube is removed from the oil bath and allowed to cool to room temperature. The tube is broken and the polymer removed as a small opaque cylinder. The polymer weight is 2.88 g, which equals 88.5 percent mass recovery. The copolymer has very good thermal and thermooxidative stability. Thermal Gravimetric Analysis of the copolymer in a nitrogen atmosphere, using a DuPont Model 951 Thermogravimetric Analyzer, shows 1 percent weight loss at 401° C. and 5 percent weight loss at 456° C.

What is claimed is:

1. A mixture of monomers comprising
   (1) at least one polymaleimide in an amount sufficient to provide higher thermal stability in a cured copolymer compared to that observed for polymaleimide homopolymers; and
   (2) an internal olefinic mono(cyclobutarene) in an amount sufficient to provide decreased water absorption in a cured copolymer compared to that observed for polymaleimide homopolymers.

2. The mixture of claim 1, wherein an optional free radical inhibitor is added in an amount sufficient to increase the molten monomer mixture's pot life, and to increase the cured resin's toughness compared to that observed for polymaleimide homopolymers.

3. The mixture of claim 2, wherein an optional monovinylidene mono(cyclobutarene) monomer component is added in an amount sufficient to lower the polymerization initiation temperature compared to that observed for polymaleimide homopolymers 4. A copolymer comprising, in copolymerized form, the polymaleimide and the internal olefinic mono(cyclobutarene) of claim 1.

5. The copolymer of claim 4, wherein an optional free radical inhibitor is added in an amount sufficient to increase the molten monomer mixture's pot life and to increase the cured resin's toughness compared to that observed for polymaleimide homopolymers.

6. The copolymer of claim 4 wherein the polymaleimide is represented by the formula:

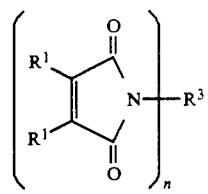

wherein
- n is an integer of 2 or greater;
- $R^1$ is separately and independently in each occurrence, a monovalent moiety, provided that $R^1$ does not interfere with polymerization;
- $R^3$ is an n-valent bridging member comprising an n-valent organic or heteroatom containing organic moiety; and the mono(cyclobutarene) is represented by the formula:

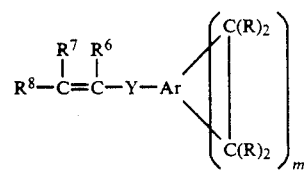

wherein
- Ar is a polyvalent aromatic moiety, an ar-poly-yl, having three or more valences, provided that two carbon atoms of the cyclobutane ring are bonded to adjacent carbon atoms on the same aromatic ring of Ar;
- Y is a covalent bond or a divalent organic or inorganic moiety;
- m is an integer of at least 1;
- R is a monovalent moiety;
- $R^6$ and $R^7$ are individually hydrogen or an alkyl moiety; and
- $R^8$ is hydrogen or a monovalent organic moiety provided that when $R^7$ is hydrogen, $R^8$ is a monovalent organic moiety.

7. The copolymer of claim 6, wherein the polymaleimide is 1,1'-(methylenedi-4,1-phenylene) bismaleimide and the mono(cyclobutarene) is 3-(2-(4-methylphenyl)ethenyl)-bicyclo(4.2.0)octa-1,3,5-triene.

8. A process comprising combining the polymaleimide and the internal olefinic mono(cyclobutarene) of claim 1.

9. A mixture of monomers comprising
   (1) at least one polymaleimide in an amount sufficient to provide higher thermal stability in a cured copolymer than that observed for polymaleimide homopolymers; and
   (2) a monovinylidene mono(cyclobutarene) in an amount sufficient to provide a lower polymerization onset temperature and decreased water absorption in a cured copolymer compared to that observed for polymaleimide homopolymers.

10. The mixture of claim 9, wherein an optional free radical inhibitor is added in an amount sufficient to increase the molten monomer mixture's pot life, and to increase the cured resin's toughness compared to that observed for polymaleimide homopolymers.

11. A copolymer comprising, in copolymerized form, the polymaleimide and the monovinylidene mono(cyclobutarene) of claim 9.

12. The copolymer of claim 11, wherein an optional free radical inhibitor is added in an amount sufficient to increase the molten monomer mixture's pot life, and to increase the cured resin's toughness compared to that observed for polymaleimide homopolymers.

13. The copolymer of claim 11 wherein the polymaleimide is represented by the formula:

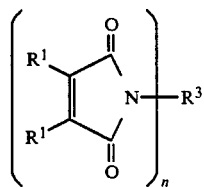

wherein
n is an integer of 2 or greater;
R$^1$ is separately and independently in each occurrence, a monovalent moiety, provided that R$^1$ does not interfere with polymerization;
R$^3$ is an n-valent bridging member comprising an n-valent organic or heteroatom containing organic moiety; and
the mono(cyclobutarene) is represented by the formula:

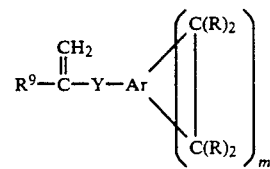

wherein
Ar is a polyvalent aromatic moiety having three or more valences provided that the carbons of the cyclobutane ring are bonded to adjacent carbon atoms on the same aromatic ring of Ar;
Y is a covalent bond or a divalent organic or inorganic moiety;
m is an integer of at least 1;
R is a monovalent moiety; and
R$^9$ is a monovalent organic moiety or a heteroatom containing monovalent organic moiety.

14. The copolymer of claim 13, wherein the polymaleimide is 1,1'-(methylenedi-4,1-phenylene)-bis-maleimide and the mono(cyclobutarene) is 3-(1-(4-methylphenyl)ethenyl)-bicyclo(4.2.0)octa-1,3,5-triene.

15. A process comprising combining the polymaleimide and the monovinylidene mono(cyclobutarene) of claim 9.

16. A mixture of monomers comprising at least one polymaleimide and an internal olefinic mono(cyclobutarene) in a mole ratio range of polymaleimide to internal olefinic mono(cyclobutarene) of about 80:20 to about 20:80.

17. A mixture of monomers comprising at least one polymaleimide and a monovinylidene mono(cyclobutarene) in a mole ratio range of polymaleimide to monovinylidene mono(cyclobutarene) of about 80:10 to about 20:80.

* * * * *

UNITED STATES PATENT AND TRADEMARK OFFICE
CERTIFICATE OF CORRECTION

PATENT NO. : 5,247,037

DATED : September 21, 1993

INVENTOR(S) : Robert A. Kirchhoff, Lana S. Spencer, and Kenneth J. Bruza

It is certified that error appears in the above-identified patent and that said Letters Patent is hereby corrected as shown below:

Col. 22, line 36, "80:10" should read -- 80:20 --.

Signed and Sealed this

Sixteenth Day of August, 1994

Attest:

BRUCE LEHMAN

Attesting Officer

Commissioner of Patents and Trademarks